(12) United States Patent
Dong

(10) Patent No.: US 10,296,191 B2
(45) Date of Patent: May 21, 2019

(54) METHOD AND DEVICE FOR CHANGING DISPLAY BACKGROUND

(71) Applicant: Xiaomi Inc., Beijing (CN)

(72) Inventor: Junjie Dong, Beijing (CN)

(73) Assignee: Xiaomi Inc., Beijing (CN)

(*) Notice: Subject to any disclaimer, the term of this patent is extended or adjusted under 35 U.S.C. 154(b) by 271 days.

(21) Appl. No.: 15/242,984

(22) Filed: Aug. 22, 2016

(65) Prior Publication Data

US 2017/0090732 A1 Mar. 30, 2017

(30) Foreign Application Priority Data

Sep. 29, 2015 (CN) .......................... 2015 1 0633238

(51) Int. Cl.
| | |
|---|---|
| G06F 3/048 | (2013.01) |
| G06F 3/0484 | (2013.01) |
| G06Q 30/00 | (2012.01) |
| H04L 29/08 | (2006.01) |

(52) U.S. Cl.
CPC ......... *G06F 3/04845* (2013.01); *G06Q 30/00* (2013.01); *H04L 67/26* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 2004/0201793 A1 | 10/2004 | Anandan et al. | |
| 2009/0150786 A1* | 6/2009 | Brown .............. | G06F 17/30035 715/733 |
| 2009/0163182 A1* | 6/2009 | Gatti ................. | H04M 1/72544 455/414.1 |
| 2010/0211575 A1 | 8/2010 | Collins et al. | |
| 2012/0042245 A1* | 2/2012 | Askey ............... | G06F 17/30761 715/716 |
| 2012/0278166 A1 | 11/2012 | Badros et al. | |

(Continued)

FOREIGN PATENT DOCUMENTS

| | | |
|---|---|---|
| CN | 101314081 A | 12/2008 |
| CN | 102904929 A | 1/2013 |

(Continued)

OTHER PUBLICATIONS

English version of International Search Report of PCT/CN2015/099736, mailed from the State Intellectual Property Office of China dated Jul. 1, 2016.

(Continued)

*Primary Examiner* — Xuyang Xia
(74) *Attorney, Agent, or Firm* — Finnegan, Henderson, Farabow, Garrett & Dunner LLP

(57) ABSTRACT

A method for changing a display background is disclosed. The method may be implemented by a server. The method may comprise acquiring a user preference label set of a current user and a background label set of each candidate background; matching the current user with each candidate background based on the acquired user preference label set and the acquired background label set to obtain a match result; selecting one or more recommended backgrounds for the current user based on the match result; and pushing the selected one or more recommended backgrounds to a mobile terminal of the current user.

16 Claims, 9 Drawing Sheets

(56) References Cited

U.S. PATENT DOCUMENTS

2014/0337714 A1  11/2014  Mu
2015/0248760 A1   9/2015  Barrus et al.

FOREIGN PATENT DOCUMENTS

| CN | 103500212 A | 1/2014 |
| CN | 104102409 A | 10/2014 |
| CN | 104156356 A | 11/2014 |
| CN | 104317959 A | 1/2015 |
| CN | 104885049 A | 9/2015 |
| CN | 105354018 A | 2/2016 |
| EP | 2056605 A1 | 5/2009 |
| EP | 2076001 A1 | 7/2009 |
| JP | 2002-215074 A | 7/2002 |
| JP | 2016-532930 A | 10/2010 |
| KR | 10-2010-0101159 A | 9/2010 |
| RU | 2412463 C2 | 2/2011 |
| WO | WO 2007/106842 A2 | 9/2007 |
| WO | WO 2014/161352 A1 | 10/2014 |

OTHER PUBLICATIONS

Extended European Search Report issued in European Patent Application No. 16166824.9, mailed from the European Patent Office, dated Dec. 19, 2016.

Office Action and Search Report issued in Russian Patent Application No. 2016113340/08(020953), dated May 29, 2017.

International Search Report of PCT/CN2015/099736, mailed from the State Intellectual Property Office of China dated Jul. 1, 2016.

\* cited by examiner

400 under US 10,296,191 B2

METHOD AND DEVICE FOR CHANGING DISPLAY BACKGROUND

CROSS-REFERENCE TO RELATED APPLICATIONS

The present application is based upon and claims priority to Chinese Patent Application No. 201510633238.2, filed Sep. 29, 2015, the entire contents of which are incorporated herein by reference.

TECHNICAL FIELD

The present disclosure generally relates to the field of mobile communication technology, and more particularly, to a method and a device for changing a display background.

BACKGROUND

With a growing popularity of smart mobile terminals, more and more users are getting used to applications or functions provided by the mobile terminals. For example, a lock screen interface and a desktop are most frequently used. The mobile terminal can provide various backgrounds for the user to apply as the lock screen interface or the desktop. The richness of the background selection choices can influence user experience for the mobile terminal.

Most users may get bored of a mobile terminal background over a time period and want to change to a new background. In the related art, a display background such as a background of a lock screen or a desktop typically comes from a picture stored in the mobile terminal or an on-line background picture developed for the mobile terminal, and the change of the background requires manual configuration by the user through a desktop program.

SUMMARY

One aspect of the present disclosure is directed to a method for changing a display background is disclosed. The method may be implemented by a server. The method may comprise acquiring a user preference label set of a current user and a background label set of each candidate background; matching the current user with each candidate background based on the acquired user preference label set and the acquired background label set to obtain a match result; selecting one or more recommended backgrounds for the current user based on the match result; and pushing the selected one or more recommended backgrounds to a mobile terminal of the current user.

Another aspect of the present disclosure is directed to a device. The device may comprise a processor and a memory for storing instructions executable by the processor. The processor may be configured to perform: acquiring a user preference label set of a current user and a background label set of each candidate background; matching the current user with each candidate background based on the acquired user preference label set and the acquired background label set to obtain a match result; selecting one or more recommended backgrounds for the current user based on the match result; and pushing the selected one or more recommended backgrounds to a mobile terminal of the current user.

Another aspect of the present disclosure is directed to a device. The device may comprise a processor and a memory for storing instructions executable by the processor. The processor may be configured to perform: collecting a user preference label set of a current user; sending the user preference label set of the current user to a server, for the server to match the current user with each candidate background based on the user preference label set and an acquired background label set of the candidate background to obtain a match result, and to select one or more recommended backgrounds for the current user based on the match result; and receiving the selected one or more recommended backgrounds pushed by the server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

The terms used herein are merely for describing a particular embodiment, rather than limiting the present disclosure. As used in the present disclosure and the appended claims, terms in singular forms such as "a," "said," and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when," "where," or "in response to".

Figure 1:
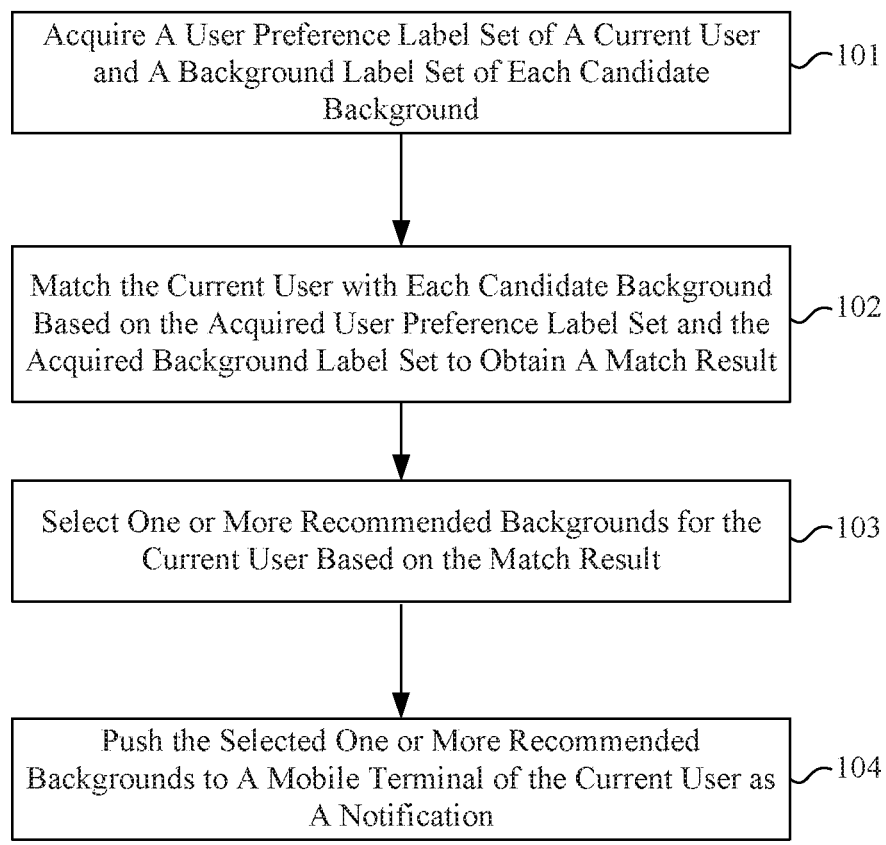
FIG. 1 is a flow chart illustrating a method for changing a display background, according to an exemplary embodiment of the present disclosure.

FIG. 1 is a flow chart illustrating a method 100 for changing a display background, according to an exemplary embodiment of the present disclosure. The method 100 may include the following steps.

In step 101, a user preference label set of a current user and a background label set of each candidate background are acquired.

A user preference towards a background can be represented by the user preference label set. The background label set can represent a style of the candidate background.

In step 102, the current user is matched with each candidate background based on the acquired user preference label set and the acquired background label set to obtain a match result.

Step 102 may include:

acquiring a correlation between each user preference label in a user preference label set of the current user and each background label in a background label set of a current candidate background, and the correlation can be determined according to a number of times that both of the user preference label and the background label are present in the user preference label set or in the background label set;

summing up correlations between all of the user preference labels of the current user and all of the background labels of the current candidate background, averaging the sum against a total number of the user preference labels of the current user, to obtain a correlation between the current user and the current candidate background; and ranking the correlations between the current user and all of the candidate backgrounds, to obtain the match result of the current user and each of the candidate backgrounds according to the ranking result.

Summing up the correlations between all of the user preference labels of the current user and all of the background labels of the current candidate background may include: according to a weight of each of the user preference labels of the current user, summing up correlations between all of the user preference labels of the current user and all of the background labels of the current candidate background.

In step 103, one or more recommended backgrounds are selected for the current user based on the match result.

In step 103, a preset number of top-ranked backgrounds can be selected for the current user based on the match result.

In step 104, the selected one or more recommended backgrounds are pushed to a mobile terminal of the current user as a notification.

The steps described above can be performed by a server or a mobile terminal with a data processing capability.

In some embodiments, by acquiring a user preference label set of a current user and a background label set of each candidate background, and matching the current user with each candidate background based on the user preference label set of the current user and the background label set of the candidate background, a match result can be obtained. One or more recommended backgrounds can be selected for the current user based on the match result, and the selected one or more recommended backgrounds can be pushed to a mobile terminal of the current user as a notification to change the background. Thus, a display background change according to user preference can be recommended automatically to provide convenience for the user.

Figure 2:
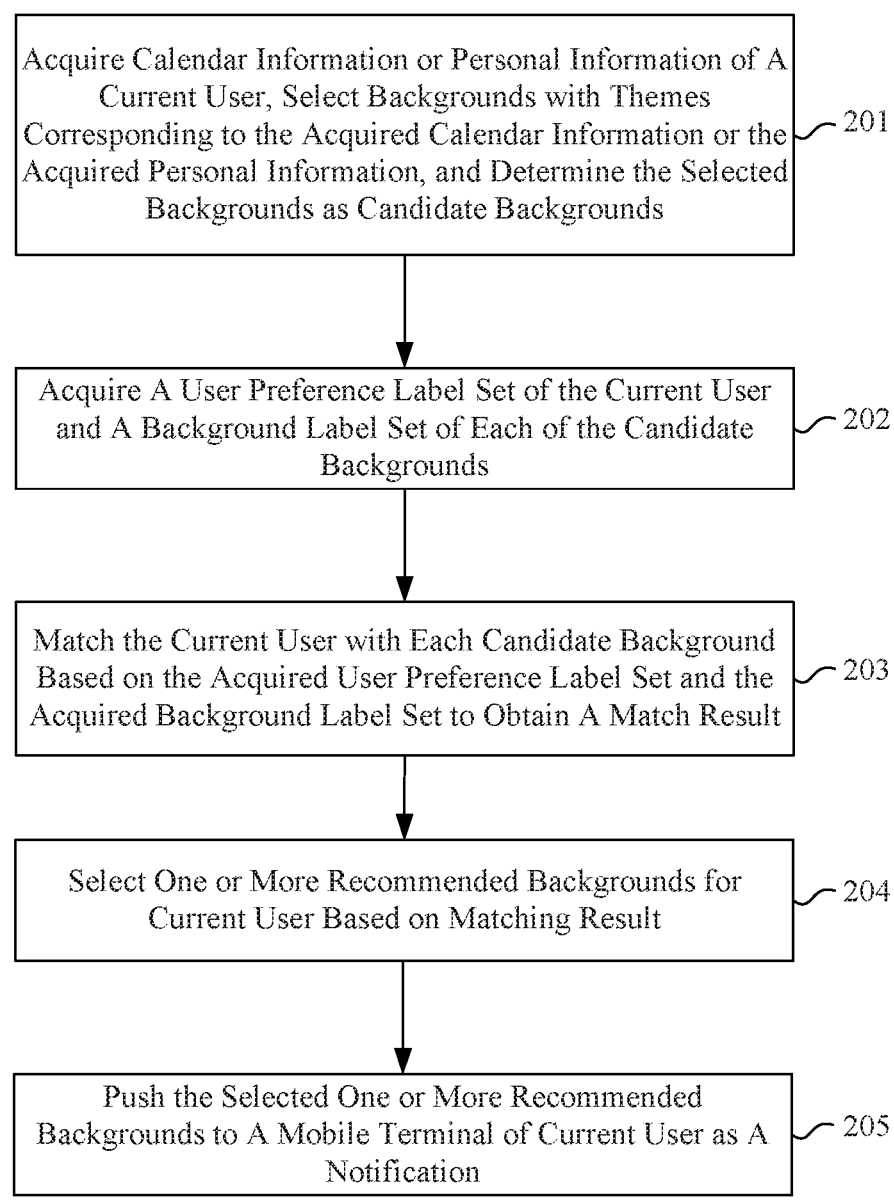
FIG. 2 is a flow chart illustrating a method for changing a display background, according to an exemplary embodiment of the present disclosure.

FIG. 2 is a flow chart illustrating a method 200 for changing a display background, according to an exemplary embodiment of the present disclosure. The method 200 may include the following steps.

In step 201, calendar information or personal information of a current user is acquired, backgrounds with themes corresponding to the acquired calendar information or the acquired personal information are selected, and the selected backgrounds are determined as candidate backgrounds.

In step 201, backgrounds with themes corresponding to calendar information or personal information can be selected. For example, backgrounds with a theme of a national celebration day can be selected when it is close to the national celebration day. For another example, backgrounds with a theme of a constellation based on the constellation of the user can be selected.

In step 202, a user preference label set of the current user and a background label set of each of the candidate backgrounds are acquired.

In step 203, the current user is matched with each candidate background based on the acquired user preference label set and the acquired background label set to obtain a match result, similar to the above description in connection with step 102 (FIG. 1).

In step 204, one or more recommended backgrounds are selected for the current user based on the match result.

In step 204, a preset number of top-ranked backgrounds can be selected for the current user based on the match result. The preset number can be selected as desired, such as 1, 2, 3, and etc.

In step 205, the selected one or more recommended backgrounds are pushed to a mobile terminal of the current user as a notification.

After the mobile terminal of the current user receives the recommended backgrounds, the desktop of the mobile terminal or the lock screen interface can be changed to the recommended backgrounds.

The above steps can be performed by a server or by a mobile terminal with a data processing capability.

In some embodiments, based on calendar information or personal information, backgrounds with themes corresponding to the calendar information or the personal information can be selected as candidate backgrounds. Then, a user preference label set of a current user and a background label set of each candidate background can be acquired. The current user can be matched with each candidate background based on the user preference label set and the background label set. One or more recommended backgrounds can be selected and pushed to a mobile terminal of the current user as a notification to change background. Thus, a display background change according to user preference can be recommended automatically to provide convenience for the user.

Figure 3:
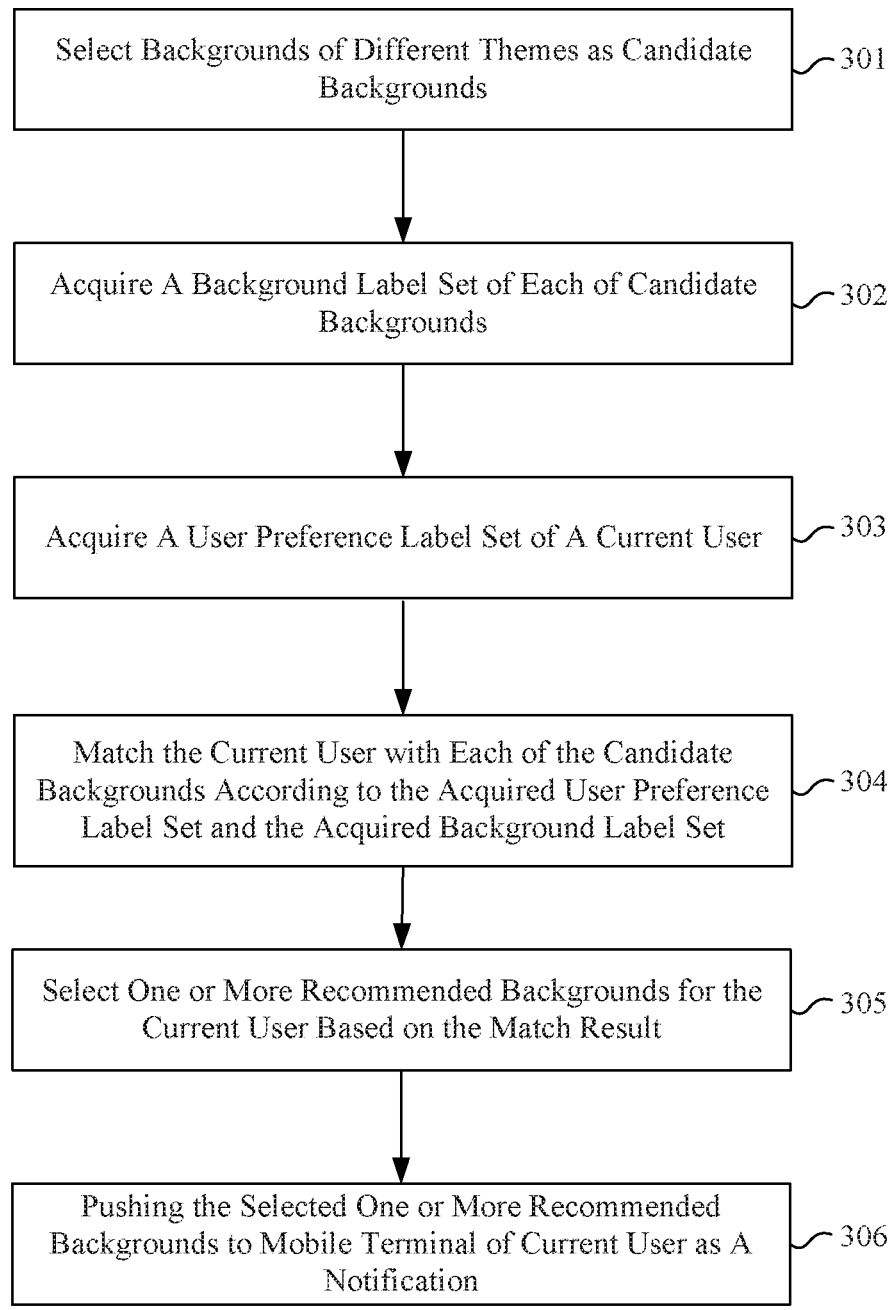
FIG. 3 is a flow chart illustrating a method for changing a display background, according to an exemplary embodiment of the present disclosure.

FIG. 3 is a flow chart illustrating a method 300 for changing a display background, according to an exemplary embodiment of the present disclosure. The method 300 can be implemented by a server or a mobile terminal with a data processing capability.

In some embodiments, the server can be a background resource server. The background resource server may provide various background resources, select a background which matches a preset condition, and push the background to a mobile terminal as a notification. The mobile terminal can acquire the background pushed by the background resource server through its desktop background management program. The mobile terminal can automatically download the background from the background resource server, or can receive the background sent by the background resource server. The mobile terminal can download backgrounds at a fixed times every day. After the mobile terminal acquires the background pushed by the background resource server, the mobile terminal may change the background at that time or when a preset condition is satisfied.

In some embodiments, the server can manage user information and user preference information uploaded by the mobile terminal, store and manage various background pictures, and provide a backstage program for uploading and managing background pictures. The server can automatically match the user preference with candidate backgrounds, for push-notifying a background picture to the mobile terminal of the user based on a match result. The mobile terminal can be installed with client software. The client software can manage register, log in, and modification of user accounts, collect user preference information, feed the user preference information to the server, search for a background and download a background periodically from the server, and transmit a background to a desktop background management program to change a background.

The method 300 may include the following steps.

In step 301, backgrounds of different themes are selected as candidate backgrounds.

In step 301, the server selects backgrounds of various themes. The themes of the backgrounds can be determined based on calendar information or personal information. Therefore, the server can select backgrounds with themes corresponding to the calendar information or the personal information as candidate backgrounds. The calendar information can include, for example, a festival, a holiday, a solar term, and the like. The personal information can include for example, a birthday, a constellation, a wedding anniversary, and the like. For example, on a traditional spring festival, festive desktop can be selected. On a legal holiday, such as a national celebration day, backgrounds relevant to a National Day can be selected. On a birthday, desktop backgrounds with cakes and flowers can be selected. For some young people believing in constellation and fortune, desktop backgrounds predicting fortune based on the constellation of the user can be selected.

In step 302, a background label set of each of the candidate backgrounds is acquired.

Since users may have different aesthetic tastes, for example, some prefer bright colors, while others prefer dim lights, the backgrounds can be associated with different background labels. A background label can be defined by a background designer, a background uploading user, or a background applying user, or can be defined by the server. For the same theme, backgrounds of different styles can be provided to the user. Each style corresponding to a background can be represented by a background label.

The background label can be defined in various forms. For example, a background label can be fresh, hazy, hot, rock, etc. A background can have more than one background label.

In step 303, a user preference label set of a current user is acquired.

A user preference to backgrounds can be represented by a user preference label set. A user preference label set can include a plurality of labels. That is, a user preference label set may include more than one label representing a user preference, and each of the labels can have a different weight.

For example, if a user likes fresh, hazy, and abstract backgrounds, the user preference label set of the user can include a label "fresh," a label "hazy," and a label "abstract."

In some embodiments, users' preference to a background can be determined through any one of the following manners.

1) Determination based on records of an evaluation mechanism of the server. An evaluation mechanism of the server may record a user's evaluation to a current background such as: like, dislike, neutral, etc. For example, a user's evaluation to a background with a background label "fresh" is "like," and that to another background with a background label "bright" is "neutral." In this case, the user preference label set of this user is: "fresh, bright."

2) Determination based on user selections recorded in the server. The server can record backgrounds independently selected by the user. The selected backgrounds may be backgrounds the user likes, and backgrounds not selected by the user may be backgrounds the user does not like. For example, a user selects a background with a background label "fresh" by himself, it can be determined that the user preference label of this user is: "fresh."

3) Determination based on self-description of the user recorded in the server. The server can record a user preference label edited by the user himself, such as "fresh," "hazy," etc., or can receive a user preference label directly sent by a user to the server.

For the user preference labels, each of the labels can have a different weight, e.g., a weight of a user preference label.

When a user applies a background for a first time, the user may select a label as the user preference label, or add a label edited by the user himself as the user preference label. At this time, the weight of each label can be the same. For example, the user preference label set can include label "fresh" and label "hazy," and the label "fresh" and the label "hazy" can have the same weight.

Subsequently, if the user likes a certain background more, the user preference label corresponding to the background label of the background will have an increased weight. Similarly, if the user dislikes a certain background, the user preference label corresponding to the background label of the background will have a decreased weight. For example, if subsequently, the user selects more backgrounds each with a background label "fresh," the user preference label "fresh" will have an increased weight. If subsequently, the user selects "dislike" evaluation on backgrounds each with a background label "hazy," or the user does not select a "hazy" background for a long time, the user preference label "hazy" will have a decreased weight.

In some embodiments, the weights can be determined through a weight correction algorithm. The weights can be determined in consideration of two factors: time and frequency. In a preset time period, a weight of the label will be increased with a more number of evaluation "like" on a certain label in the user preference label set, and vice versa. However, when the weight is increased or decreased to a certain level, the rate of increase or decrease will be lowered.

In the present disclosure, the weight correction algorithm can be described as follows.

A weight value can include two parts, that is: $W=B+F$.

W denotes a weight value.

B denotes a base weight. A base weight can be determined by the user, or can be determined according to a user description of the preference.

F denotes a behavior weight. A behavior weight can be determined based on user evaluation.

The base weight can be relatively constant. Once a user selects a certain label, the user can determine a constant value for the base weight. The base weight of each label can be the same. For example, the labels "label" and "hazy" can have the same weight, such as score 2.

The behavior weight can be determined based on preference evaluations, including user preference evaluation during a preset time period when a background is in use. Therefore, the behavior weight may not be constant and can vary over time. For example, the preference evaluation may include three levels: "like," "neutral," and "dislike," corresponding to score 3, score 2, and score 1 from high to low respectively.

The behavior weight F can be calculated as: F=R(T, S)

S denotes a total score (a sum of scores of all evaluations during a fixed time period), T denotes a time, and R denotes a calculation function.

In some embodiments, there can be three kinds of time periods, for example, a most recent week, a most recent month, and since the user registered. The time periods are only illustrative, and there can be other lengths of time periods depending on practical applications.

Taking all three kinds of time periods into consideration, it can be derived that:

$$F=R1(T1,S1)+R2(T2,S2)+R3(T3,S3)$$

R1(T1,S1) denotes a function R1 of a total score (S1) during a most recent week (T1).

R2(T2,S2) denotes a function R2 of a total score (S2) during a most recent month (T2).

R3(T3,S3) denotes a function R3 of a total score (S3) during a time period (T3) since the user registered.

For a newly registered user, or a user registered a short time ago, the time period of record is too short, such as less than 1 minute. Then, T can be taken as 0.

The above R1, R2, and R3 are three different functions, and function values of R1, R2, and R3 are in an order: R1>R2>R3. Thus, more recent evaluations or operations of the user can be given more weights.

The functions R1, R2, and R3 can be logarithmic functions or similar functions to meet the following requirement: with an increase or decrease of the total score S, a function value R will be increased or decreased with a rate smaller than a rate at which S increases or decreases, and when S increases or decreases to a certain level, the function value R will approach a constant value and will not increase or decrease any more.

Step 303 can be performed after or before step 302.

In step 304, the current user is matched with each of the candidate backgrounds according to the acquired user preference label set and the acquired background label set.

The matching can be performed by determining correlations between user preference labels and background labels.

In step 304, a correlation between each of the user preference labels of the current user and each of the background labels of the current candidate background can be acquired, and all of the correlations can be summed up. The sum can be averaged against a total number of the user preference labels of the current user, to obtain a correlation between the current user and the current candidate background. A correlation between the current user and each of the candidate backgrounds can be acquired, and the correlations can be ranked. A match result of the current user and the candidate backgrounds can be obtained based on the ranking result.

In some embodiments, after a correlation between each of the user preference labels of the current user and each of the background labels of a current candidate background are acquired, firstly, each of the user preference labels can be matched with each of the background labels, to obtain correlations between the user preference labels and the background labels. Then, the correlations between the user preference labels and the background labels can be summed up, while using weights of the user preference labels as coefficients. That is, a weighted sum of the correlations are calculated, to obtain a total score. The total score can be divided by the total number of the user preference labels to obtain a final score as a correlation between the current user and the current candidate background. Correlations between the current user and all of the candidate backgrounds can be ranked, and a correlation with the highest final score can be considered as having the highest matching degree, the second highest final score having the second highest matching degree, and so on.

The labels can be denoted by lowercase letters a, b, c, d . . . , and the correlations of the labels can be calculated with a function R which can be a probability function such as a percentage function or the like. R(a, b) can denote a correlation between a and b. A weight of a label can be calculated by a function W, and W(a) can denote a user preference weight of a label a.

The user preference label set of the current user can be a and b, and background label set of a candidate background can be c and d. Then, the total score M can be obtained through the following equation.

$$M=(R(a,c)+R(a,d))*W(a)+(R(b,c)+R(b,d))*W(b)$$

The final score F=M/2. That is, a correlation between the current user and the current candidate background can be F=M/2.

Since there are two user preference labels a and b, the final score can be M divided by 2, to obtain an average value. If there are a number N of labels, M can be divided by N.

If there are user preference labels a, b, and c, then:

$$M=(R(a,c)+R(a,d))*W(a)+(R(b,c)+R(b,d))*W(b)+(R(e,c)+R(e,d))*W(e)$$

The final score can be F=M/3.

If there are background labels c, d, and e, then:

$$M=(R(a,c)+R(a,d)+R(a,e))*W(a)+(R(b,c)+R(b,d)+R(b,e))*W(b)$$

The final score can be F=M/2.

After the correlation between the current user and the current candidate background is obtained, the correlations between the current user and all of the candidate backgrounds can be ranked, to obtain a correlation with a highest final score, as a correlation with the highest matching degree.

The above correlation can be acquired by directly searching a correlation table which contains correlations already calculated and determined.

The above correlation between a user preference label and a background label can be determined according to a number of times that both of the user preference label and the background label are present in a user preference label set of the same user, or a number of times that both of the user preference label and the background label are present in a background label set of the same background.

For example, a correlation R(a,c) can be determined according to a ratio of the number of times that both of the labels a, c are present in a user preference label set or a background label set against a total number of the number of users and the number of the backgrounds. R(a,c) can be a probability calculation result. If there is a high probability that both of the labels are present in a user preference label set or a background label set, the two labels may have a high correlation. If there is a low probability that both of the labels are present in a user preference label set or a background label set, the two labels may have a low correlation. For example, labels "fresh" and "hazy" may have a high correlation, and labels "bright" and "hazy" may have a low correlation.

In some embodiments, the correlation may be determined through the following process.

For example, on the server, there are a number N of users and a number M of backgrounds. Each of the users may correspond to a user preference label set, and each of the backgrounds may correspond to a background label set. The number of labels for each of the users or for each of the backgrounds should be larger or equal to 1.

The correlation may be determined through the following process.

1) A mapping table X={ } is defined. In the table X, every two labels can be considered as a group, and a counting number of times that both of the two labels are present in a user preference label set or a background label set is recorded.

2) Repeatedly acquire, at each time, a label of a user or a background, until all of the labels of all of the users and all of the backgrounds are acquired, to form a label list {a, b, c, d, e, d . . . }.

2.1) Every pair of labels is obtained from the label list: {a, b}, {a, c}, {a, d}, {b, c}, {b, d}, {c, d}, {c, e} . . . .

2.2) These label groups are stored in the table X. If a group of labels is already in the table X, the counting number of the group is increased by 1.

3) The sum of the total number of the users and the total number of the backgrounds is acquired as (N+M). In the table X, a ratio of the counting number of each label group to the sum of the total number of the users and the total number of the backgrounds is a correlation of the two labels in the label group.

In some embodiments, when a user or a background only has one label, in the above process, the situation can be counted in the denominator, but not in the numerator. This may be because a single label representing a combination of preference can also influence the correlation of the labels. After the above correlations are calculated, the correlations can be stored in a correlation table. A correlation can be directly acquired from the correlation table according to a combination of labels as desired, without further calculation. In addition, the table X can be stored. When a new background or a new user is added, the counting numbers of the groups of labels can be calculated again, and the correlation table can be updated accordingly. Alternatively, if a user preference label A of a user is replaced by another user preference label B, a counting number of a label group containing the replaced user preference label A can be decreased by 1 for the table X, and a counting number of a label group, containing the another user preference label B with which the user preference label A is replaced, can be increased by 1 for the table X. Thereby, the table X can be updated, and the correlation table can be updated accordingly. Once a label set of a background is determined, it may not be modified.

In some embodiments, each of the user preference labels can be paired with each of the background labels, a user preference label may not be paired with another user preference label, and a background label may not be paired with another background label.

In step 305, one or more recommended backgrounds are selected for the current user according to the match result.

In step 305, according to the final score F, a highest final score can be determined as having a highest matching degree, a second highest final score can be determined as having a second highest matching degree, and so on. Thereby, one or more recommended backgrounds ranked at the top can be selected. The server can select only a background having the highest final score as the recommended background, or can select a background having the highest final score and a background having the second highest final score as the recommended backgrounds.

In step 306, the selected one or more recommended backgrounds are pushed to the mobile terminal of the current user as a notification.

In the present step, the selected one or more recommended backgrounds are pushed to the mobile terminal of the current user for a change.

After the mobile terminal receives the one or more recommended backgrounds, the mobile terminal can change the desktop and/or the lock screen interface of the mobile terminal to a recommended background through the desktop management program.

For example, if it is a national celebration day, backgrounds with a theme of the national celebration day are selected in step 301, and a recommended background selected from the backgrounds with a theme of the national celebration day can be pushed to the current user.

If in step 301, backgrounds with a theme based on personal information such as constellation are selected, a recommended background selected from the backgrounds with a theme of constellation can be pushed to the current user.

If in step 301, the backgrounds are not selected based on different types of themes, all of the backgrounds can be selected and matched.

A selected recommended background can be pushed to the mobile terminal at a every preset item period such as 7 days.

As described, a recommended background can be automatically pushed to a user by an apparatus based on the preference of the user. It can make searching and selecting backgrounds unnecessary, save time for the user, and supply with a desired result. The user barely even needs to learn how to change different backgrounds. It is convenient particularly for a user not familiar with a mobile terminal. In addition, the background can be pushed based on calendar information and personal information. For example, on a national celebration day, a background with a theme of the national celebration day, which has a style the user likes can be pushed. Thus, with fun in operation of a mobile terminal for the user, monotonous backgrounds can be avoided.

Corresponding to the above embodiments of methods for changing a display background, embodiments regarding apparatus for changing a display background are described below.

Figure 4:
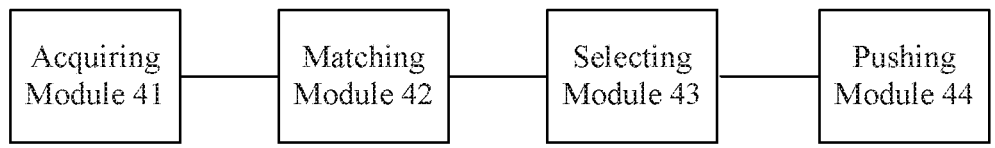
FIG. 4 is a block diagram of an apparatus for changing a display background, according to an exemplary embodiment of the present disclosure.

FIG. 4 is a block diagram illustrating an apparatus 400 for changing a display background, according to an exemplary embodiment of the present disclosure.

As shown in FIG. 4, the apparatus for changing a display background may include: an acquiring module 41, a matching module 42, a selecting module 43, and a pushing module 44.

The acquiring module 41 may be configured to acquire a user preference label set of a current user and a background label set of each candidate background.

The matching module 42 may be configured to match the current user with each candidate background based on the user preference label set and the background label set both acquired by the acquiring module 41.

The selecting module 43 may be configured to select one or more recommended backgrounds for the current user based on the match result from the matching module 42.

The pushing module 44 may be configured to push the one or more recommended backgrounds selected by the selecting module 43 to a mobile terminal of the current user as a notification.

In some embodiments, a user preference label set of a current user and a background label set of each candidate background can be acquired. The current user can be matched with each candidate background based on the acquired user preference label set and the acquired background label set, to obtain a match result. One or more recommended backgrounds can be selected for the current user based on the match result. The selected one or more recommended backgrounds can be pushed to a mobile terminal of the current user as a notification. Thus, a display background can be automatically changed according to user preference, providing convenience for the user.

Figure 5:
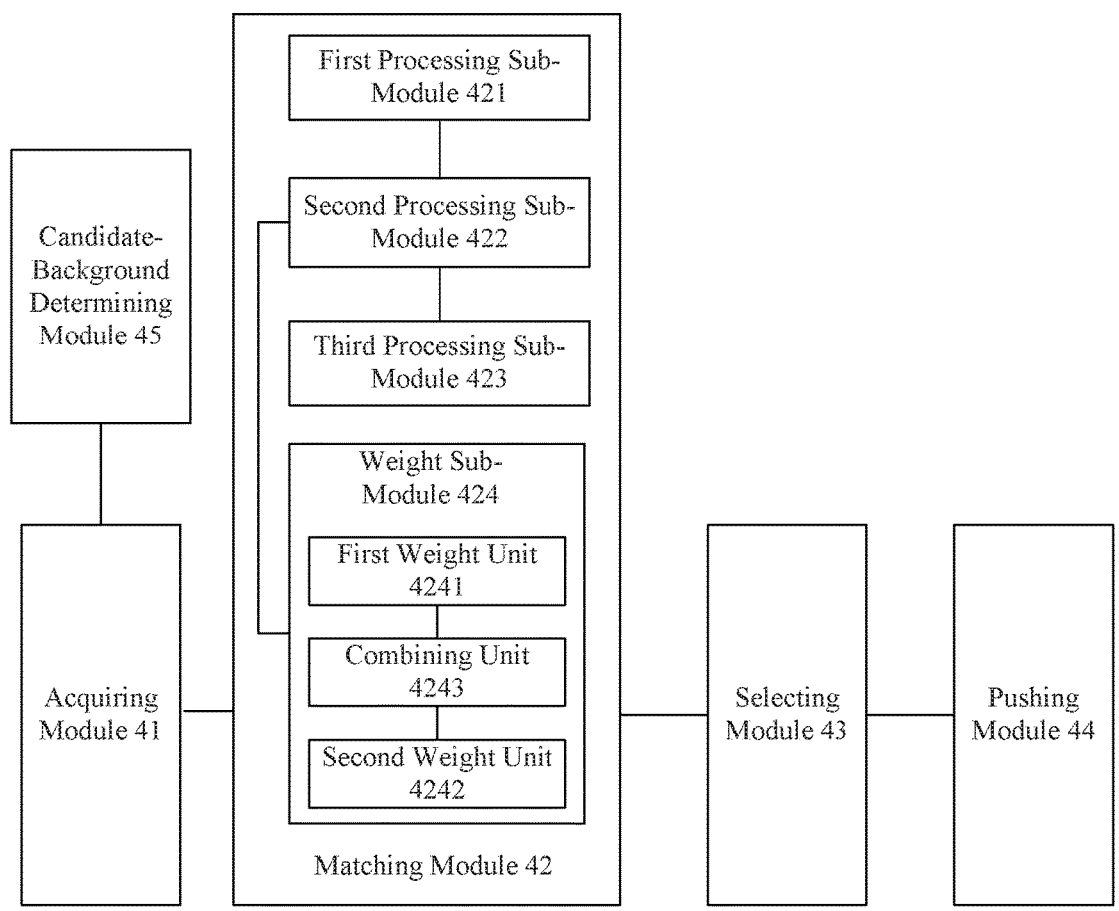
FIG. 5 is a block diagram of an apparatus for changing a display background, according to an exemplary embodiment of the present disclosure.

FIG. 5 is a block diagram illustrating an apparatus 410 for changing a display background, according to an exemplary embodiment of the present disclosure.

As shown in FIG. 5, the apparatus 410 for changing a display background may include: an acquiring module 41, a matching module 42, a selecting module 43, a pushing module 44, and a candidate-background determining module 45.

Details of the acquiring module 41, the matching module 42, the selecting module 43, and the pushing module 44 are described above with reference to FIG. 4.

The candidate-background determining module 45 may be configured to acquire calendar information or personal information of the current user, select backgrounds with themes corresponding to the calendar information or the personal information, and determine the selected backgrounds as candidate backgrounds. The acquiring module 41 may be configured to acquire a background label set of each of the candidate backgrounds determined by the candidate-background determining module 45.

The matching module 42 may include: a first processing sub-module 421, a second processing sub-module 422, and a third processing sub-module 423.

The first processing sub-module 421 may be configured to acquire a correlation between each user preference label in the user preference label set of the current user and each background label in the background label set of a current candidate background, wherein a correlation between a user preference label and a background label is determined according to a number of times that both of the user preference label and the background label are present in the user preference label set of the same user or in the background label set of the same background.

The second processing sub-module 422 may be configured to sum up correlations between all of the user preference labels of the current user and all of the background labels of the current candidate background acquired by the first processing sub-module 421, average the sum against a total number of the user preference labels of the current user, to obtain a correlation between the current user and the current candidate background.

The third processing sub-module 423 may be configured to rank the correlations between the current user and all of the candidate backgrounds acquired by the second processing sub-module 422, to obtain the match result of the current user and each of the candidate backgrounds according to the ranking result.

The matching module 42 may further include: a weight sub-module 424.

The weight sub-module 424 may be configured to determine a weight for each of the user preference labels.

The second processing sub-module 422 may be configured to, according to a weight of each of the user preference labels of the current user acquired by the weight sub-module 424, sum up correlations between all of the user preference labels of the current user and all of the background labels of the current candidate background.

The weight sub-module 424 may include: a first weight unit 4241, a second weight unit 4242, and a combining unit 4243.

The first weight unit 4241 may be configured to determine a basic weight according to a description of preference of the user.

The second weight unit 4242 may be configured to determine a behavior weight according to preference evaluation scores of the user.

The combining unit 4243 may be configured to determine the weight of each of the user preference labels according to the basic weight determined by the first weight unit 4241 and the behavior weight determined by the second weight unit 4242.

Determining the behavior weight according to preference evaluation scores of the user may include: determining the behavior weight according to preference evaluation scores of the user during a preset time period when a corresponding background is in use. A value of the behavior weight may increase or decrease with a corresponding increase or decrease of a sum of the preference evaluation scores of the user. The rate of increase or decrease may be smaller than a rate at which the sum of the preference evaluation scores of the user increases or decreases during the preset time period when the corresponding background is in use. After the sum of the preference evaluation scores reaches a preset value, the value of the behavior weight may become constant.

The above apparatus may be a part of a server or a mobile terminal.

In some embodiments, based on calendar information or personal information, backgrounds with themes corresponding to the calendar information or the personal information can be selected as candidate backgrounds. Then, a user preference label set of a current user and a background label set of each candidate background can be acquired. The current user can be matched with each candidate background based on the user preference label set of the current user and the background label set of the candidate background. One or more recommended backgrounds can be selected and pushed to a mobile terminal of the current user as a notification. Thus, a display background can be changed automatically according to the calendar information or the personal information as well as the user preference, providing convenience for the user.

Figure 6:
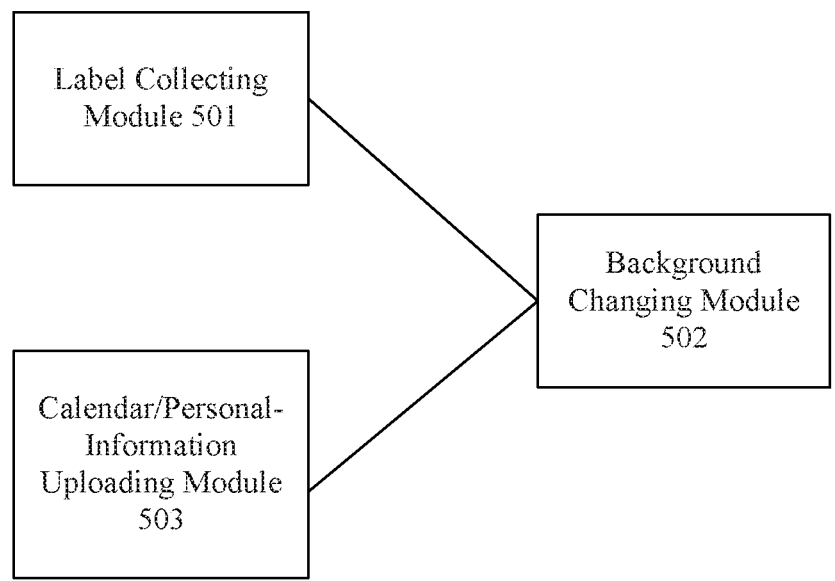
FIG. 6 is a block diagram of an apparatus for changing a display background, according to an exemplary embodiment of the present disclosure.

FIG. 6 is a block diagram illustrating an apparatus 500 for changing a display background, according to an exemplary embodiment of the present disclosure.

As shown in FIG. 6, the apparatus 500 for changing a display background may include: a label collecting module 501 and a background changing module 502.

The label collecting module 501 may be configured to collect a user preference label set of a current user, and send the user preference label set of the current user to a server, for the server to match the current user with each candidate background based on the received user preference label set of the current user and an acquired background label set of the acquired candidate background, and to select one or more recommended backgrounds for the current user based on the match result.

The background changing module 502 may be configured to receive the selected one or more recommended backgrounds pushed by the server.

The apparatus 500 may further include: a calendar/personal-information uploading module 503.

The calendar/personal-information uploading module 503 may be configured to upload to the server calendar information or personal information of the current user, for the server to select backgrounds with themes corresponding to the calendar information or the personal information, and to determine the selected backgrounds as candidate backgrounds.

The apparatus 500 may be a part of a mobile terminal.

Implementation of the functions and operations of the modules in the above devices can be referred to the implementation of the corresponding steps in the above methods.

The embodiments regarding apparatus described above are merely illustrative. The units described as separate components may be or may not be physically separate, and the components illustrated as units may be or may not be physical units, and may be at the same location, or may be distributed to multiple units over the network. A part of or the whole of the modules can be selected to achieve the objective of the present disclosure as desired. One skilled in the art can understand and practice the embodiments without paying any creative labor.

Figure 7:
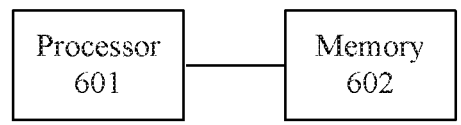
FIG. 7 is a block diagram of a device for changing a display background, according to an exemplary embodiment of the present disclosure.

FIG. 7 is a block diagram illustrating a device 600 for changing a display background, according to an exemplary embodiment of the present disclosure. The device 600 may be a server.

As shown in FIG. 7, the device 600 may include: a processor 601 and a memory 602 for storing instructions executable by the processor.

The processor 601 may be configured to perform: acquiring a user preference label set of a current user and a background label set of each candidate background; matching the current user with each candidate background based on the acquired user preference label set and the acquired background label set to obtain a match result; selecting one or more recommended backgrounds for the current user based on the match result; and pushing the selected one or more recommended backgrounds to a mobile terminal of the current user as a notification.

The memory 602 can store other programs, the details of which can be referred to the description of the process of the above methods. The processor 601 can also be configured to perform the other programs stored in the memory 602.

Figure 8:
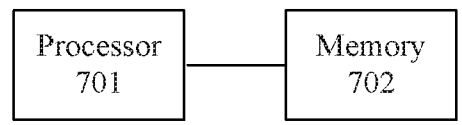
FIG. 8 is a block diagram of a device for changing a display background, according to an exemplary embodiment of the present disclosure.

FIG. 8 is a block diagram illustrating a device 700 for changing a display background, according to an exemplary embodiment of the present disclosure. The device 700 may be a terminal device.

As shown in FIG. 8, the device 700 may include: a processor 701 and a memory 702 for storing instructions executable by the processor.

The processor 701 may be configured to perform: collecting a user preference label set of a current user, and sending the user preference label set of the current user to a server, for the server to match the current user with each candidate background based on the user preference label set of the current user and an acquired background label set of the acquired candidate background, and to select one or more recommended backgrounds for the current user based on the match result; and receiving the selected one or more recommended backgrounds pushed by the server.

In some embodiments, receiving the selected one or more recommended backgrounds pushed by the server may include: receiving the one or more recommended backgrounds from candidate backgrounds selected from backgrounds with themes corresponding to calendar information or personal information of the current user by the server, and changing the desktop of the mobile terminal and/or the lock screen interface to the one or more recommended backgrounds.

Figure 9:
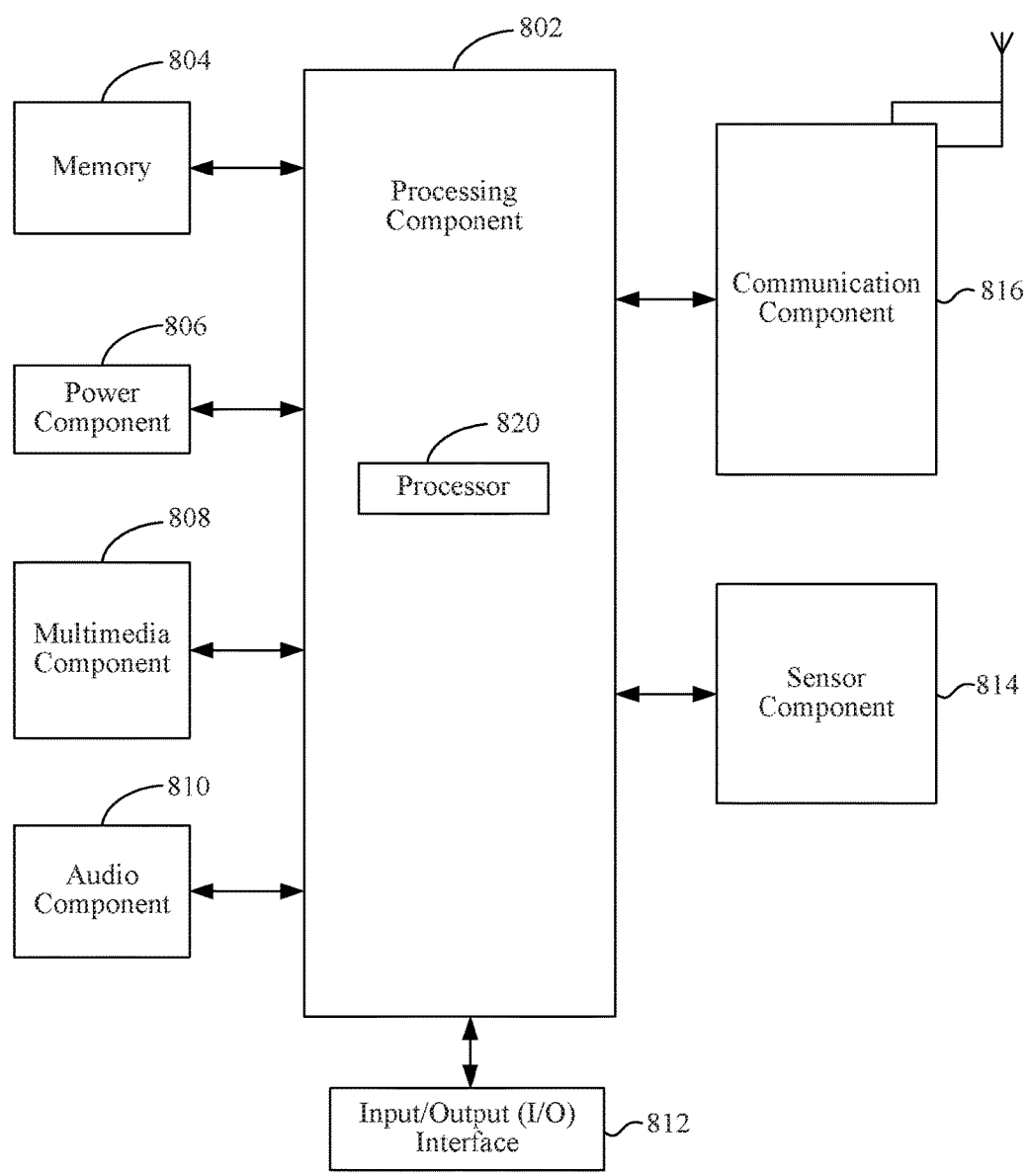
FIG. 9 is a block diagram of a device according to an exemplary embodiment of the present disclosure.

FIG. 9 is a block diagram illustrating a device 800, according to an exemplary embodiment of the present disclosure.

For example, the device 800 can be a mobile phone, a computer, a digital broadcast terminal, a messaging device, a gaming console, a tablet, a medical device, exercise equipment, a personal digital assistant, and the like.

Referring to FIG. 9, the device 800 can include one or more of the following components: a processing component 802, a memory 804, a power component 806, a multimedia component 808, an audio component 810, an input/output (I/O) interface 812, a sensor component 814, and a communication component 816.

The processing component 802 may be configured to control overall operations of the device 800, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 may be configured to store various types of data to support the operation of the device 800. Examples of such data include instructions for any applications or methods operated on the device 800, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 may provide power to various components of the device 800. The power component 806 can include a power management system, one or more power sources, and any other components associated with the generation, management, and distribution of power in the device 800.

The multimedia component 808 may include a screen providing an output interface between the device 800 and the user. In some embodiments, the screen can include a liquid crystal display (LCD) and a touch panel (TP). If the screen includes the touch panel, the screen can be implemented as a touch screen to receive input signals from the user. The touch panel may include one or more touch sensors to sense touches, swipes, and gestures on the touch panel. The touch sensors can sense a boundary of a touch or swipe action, and sense a period of time and a pressure associated with the touch or swipe action. In some embodiments, the multimedia component 808 may include a front camera and/or a rear camera. The front camera and the rear camera can receive an external multimedia datum while the device 800 is in an operation mode, such as a photographing mode or a video mode. Each of the front camera and the rear camera can be a fixed optical lens system or have focus and optical zoom capability.

The audio component 810 may be configured to output and/or input audio signals. For example, the audio component 810 may include a microphone ("MIC") configured to receive an external audio signal when the device 800 is in an operation mode, such as a call mode, a recording mode, and a voice recognition mode. The received audio signal can be further stored in the memory 804 or transmitted via the communication component 816. In some embodiments, the audio component 810 may further include a speaker to output audio signals.

The I/O interface 812 may provide an interface between the processing component 802 and peripheral interface modules, such as a keyboard, a click wheel, buttons, and the like. The buttons can include, but are not limited to, a home button, a volume button, a starting button, and a locking button.

The sensor component 814 may include one or more sensors to provide status assessments of various aspects of the device 800. For instance, the sensor component 814 can detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 may be configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 may receive a broadcast signal or broadcast associated information from an external broadcast management system via a broadcast channel. In one exemplary embodiment, the communication component 816 may further include a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of sub-modules.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium can be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for changing a display background of a mobile terminal, implemented by a server, comprising:
   acquiring a user preference label set of a current user of the mobile terminal, the user preference label set being acquired based on at least one of: background selections of the current user recorded by the server or the user preference label set edited by the current user;
   acquiring a background label set of each candidate background;
   matching the current user with each candidate background based on the acquired user preference label set and the acquired background label set to obtain a match result;
   selecting one or more recommended backgrounds for the current user based on the match result; and
   pushing the selected one or more recommended backgrounds to the mobile terminal of the current user,
   wherein the matching comprises:
      acquiring a correlation between each user preference label in the user preference label set of the current user and each background label in a background label set of a current candidate background, wherein the correlation is determined according to a number of times that both of a user preference label and a background label are present in the user preference label set of the same user or in the background label set of the same background;
      summing up correlations between all of the user preference labels of the current user and all of the background labels of the current candidate background to obtain a sum;

averaging the sum against a total number of the user preference labels of the current user, to obtain a correlation between the current user and the current candidate background; and after obtaining correlations between the current user and all of the current candidate backgrounds, ranking the correlations to obtain the match result of the current user and each of the candidate backgrounds according to a ranking result.

2. The method of claim 1, before acquiring the user preference label set of the current user and the background label set of each candidate background, further comprising:

acquiring calendar information or personal information of the current user;

selecting backgrounds with themes corresponding to the calendar information or the personal information; and determining the selected backgrounds as candidate backgrounds.

3. The method of claim 2, further comprising:

changing at least one of a background of a desktop of the mobile terminal or a lock screen interface of the mobile terminal with the one or more recommended backgrounds.

4. The method of claim 1, further comprising:

changing at least one of a background of a desktop of the mobile terminal or a lock screen interface of the mobile terminal with the one or more recommended backgrounds.

5. The method of claim 1, wherein summing up the correlations between all of the user preference labels of the current user and all of the background labels of the current candidate background comprises:

according to a weight of each of the user preference labels of the current user, summing up correlations between all of the user preference labels of the current user and all of the background labels of the current candidate background.

6. The method of claim 5, wherein:

the weight of each of the user preference labels is determined according to a basic weight and a behavior weight, the basic weight being determined according to a description of preference of the current user, and the behavior weight being determined according to preference evaluation scores of the current user.

7. The method of claim 6, wherein:

the behavior weight is determined according to the preference evaluation scores of the current user during a preset time period when a corresponding background is in use;

a value of the behavior weight increases with an increase of a sum of the preference evaluation scores of the current user, and decreases with a decrease of the sum of the preference evaluation scores of the current user;

a rate of the increase or the decrease is smaller than a rate at which the sum of the preference evaluation scores of the current user increases or decreases during the preset time period when the corresponding background is in use; and after the sum of the preference evaluation scores reaches a preset value, the value of the behavior weight becomes constant.

8. The method of claim 1, wherein selecting the one or more recommended backgrounds for the current user based on the match result comprises:

selecting a preset number of top-ranked backgrounds for the current user based on the match result.

9. A device, comprising:

a processor; and a memory for storing instructions executable by the processor;

wherein the processor is configured to perform:

acquiring a user preference label set of a current user of a mobile terminal, the user preference label set being acquired based on at least one of: background selections of the current user recorded by the device or the user preference label set edited by the current user;

acquiring a background label set of each candidate background;

matching the current user with each candidate background based on the acquired user preference label set and the acquired background label set to obtain a match result;

selecting one or more recommended backgrounds for the current user based on the match result; and pushing the selected one or more recommended backgrounds to the mobile terminal of the current user, wherein, in matching the current user with each candidate background, the processor is further configured to perform:

acquiring a correlation between each user preference label in the user preference label set of the current user and each background label in a background label set of a current candidate background, wherein the correlation is determined according to a number of times that both of a user preference label and a background label are present in the user preference label set of the same user or in the background label set of the same background;

summing up correlations between all of the user preference labels of the current user and all of the background labels of the current candidate background;

averaging the sum against a total number of the user preference labels of the current user, to obtain a correlation between the current user and the current candidate background; and after obtaining correlations between the current user and all of the current candidate backgrounds, ranking the correlations to obtain the match result of the current user and each of the candidate backgrounds according to a ranking result.

10. The device of claim 9, before acquiring the user preference label set of the current user and the background label set of the each candidate background, the processor is further configured to perform:

acquiring calendar information or personal information of the current user;

selecting backgrounds with themes corresponding to the calendar information or the personal information; and determining the selected backgrounds as candidate backgrounds.

11. The device of claim 10, wherein the processor is further configured to perform:

changing a background of a desktop of the mobile terminal or a lock screen interface of the mobile terminal with the one or more recommended backgrounds.

12. The device of claim 9, wherein the processor is further configured to perform:

changing a background of a desktop of the mobile terminal or a lock screen interface of the mobile terminal with the one or more recommended backgrounds.

13. The device of claim 9, wherein the processor is further configured to perform:

according to a weight of each of the user preference labels of the current user, summing up correlations between all of the user preference labels of the current user and all of the background labels of the current candidate background.

14. The device of claim 13, wherein:
the weight of each of the user preference labels is determined according to a basic weight and a behavior weight, the basic weight being determined according to a description of preference of the current user, and the behavior weight being determined according to preference evaluation scores of the current user.

15. The device of claim 14, wherein:
the behavior weight is determined according to the preference evaluation scores of the current user during a preset time period when a corresponding background is in use;
a value of the behavior weight increases with an increase of a sum of the preference evaluation scores of the current user, and decreases with a decrease of the sum of the preference evaluation scores of the current user;
a rate of the increase or the decrease is smaller than a rate at which the sum of the preference evaluation scores of the current user increases or decreases during the preset time period when the corresponding background is in use; and
after the sum of the preference evaluation scores reaches a preset value, the value of the behavior weight becomes constant.

16. The device of claim 9, wherein the processor is further configured to perform:
selecting a preset number of top-ranked backgrounds for the current user based on the match result.

* * * * *